(12) United States Patent
Schneider et al.

(10) Patent No.: US 12,025,240 B2
(45) Date of Patent: Jul. 2, 2024

(54) VALVE DEVICE

(71) Applicant: BIERI HYDRAULIK AG, Liebefeld (CH)

(72) Inventors: Wolfgang Friedrich Wilhelm Schneider, Thun (CH); Roger Daniel Tanner, Liebefeld (CH)

(73) Assignee: BIBRI HYDRAULIK AG, Liebefeld (CH)

( * ) Notice: Subject to any disclaimer, the term of this patent is extended or adjusted under 35 U.S.C. 154(b) by 25 days.

(21) Appl. No.: 18/007,824

(22) PCT Filed: Jun. 11, 2021

(86) PCT No.: PCT/EP2021/065746
§ 371 (c)(1),
(2) Date: Dec. 2, 2022

(87) PCT Pub. No.: WO2021/259667
PCT Pub. Date: Dec. 30, 2021

(65) Prior Publication Data
US 2023/0228345 A1 Jul. 20, 2023

(30) Foreign Application Priority Data
Jun. 23, 2020 (DE) ..................... 10 2020 003 751.8

(51) Int. Cl.
*F16K 31/06* (2006.01)
*F16K 11/07* (2006.01)
(Continued)

(52) U.S. Cl.
CPC .......... *F16K 35/16* (2013.01); *F16K 11/0704* (2013.01); *F16K 11/22* (2013.01);
(Continued)

(58) Field of Classification Search
CPC .. F16K 11/22; F16K 31/0627; F16K 11/0704; F16K 31/003; F16K 31/0624
See application file for complete search history.

(56) References Cited

U.S. PATENT DOCUMENTS 2,579,134 A * 12/1951 Worthington ....... F16K 11/0704
91/443
2,661,765 A * 12/1953 Troy ....................... F16K 11/22
251/297

(Continued)

FOREIGN PATENT DOCUMENTS

DE         196 17 849      11/1997
DE    20 2006 014 780       1/2007

(Continued)

OTHER PUBLICATIONS

International Search Report (ISR) issued Sep. 20, 2021 in International (PCT) Application No. PCT/EP2021/065746.

*Primary Examiner* — Umashankar Venkatesan
(74) *Attorney, Agent, or Firm* — WENDEROTH, LIND & PONACK, L.L.P.

(57) ABSTRACT

A valve device has a valve housing (10), in which fluid ports (P, A, T) are provided and in which at least one valve piston (12, 14) can be moved longitudinally. The valve piston either separates at least two of the fluid ports (P, A, T) from one another or interconnects them as a function of its travel position. At least one latching device (16, 18) is provided for each valve piston (12, 14) for the detachable fastening of the respective valve pistons (12, 14) in one of its travel positions. Each latching device has at least one latching means (20), which can be brought into a latching position (22). As part of the respective latching devices (16, 18) for detachably fastening the respective valve pistons (12, 14), at least one control body (24) t can be moved independently of the respective valve pistons (12, 14), which control body is set (Continued)

up such that, in at least one blocking position, it prevents the relevant latching means (20) disposed in the latching position (22) from leaving the latching position (22) by blocking the latching means (20).

26 Claims, 3 Drawing Sheets

(51) Int. Cl.
 F16K 11/22 (2006.01)
 F16K 31/00 (2006.01)
 F16K 35/16 (2006.01)
(52) U.S. Cl.
 CPC ........ F16K 31/003 (2013.01); F16K 31/0624 (2013.01); F16K 31/0627 (2013.01)

(56) References Cited

U.S. PATENT DOCUMENTS

| | | | | |
|---|---|---|---|---|
| 2,848,014 A * | 8/1958 | Tennis | ................ | F16K 11/0704 185/37 |
| 2,954,801 A * | 10/1960 | Nelson | .................... | F15B 13/02 137/625.66 |
| 3,046,827 A * | 7/1962 | Myers | .................... | F16B 21/165 24/453 |
| 3,072,149 A * | 1/1963 | Hasbany | ............. | F16K 11/0704 251/297 |
| 3,088,489 A | 5/1963 | Stacey | | |
| 3,174,500 A * | 3/1965 | Johnson | .................. | F15B 1/027 251/297 |
| 3,218,882 A * | 11/1965 | Stephens | .................. | G05G 5/06 74/41 |
| 3,511,276 A * | 5/1970 | Jessen | ................. | F16K 11/0704 137/625.69 |
| 3,528,638 A * | 9/1970 | Finley | ................. | F16K 11/0704 251/73 |
| 3,837,359 A | 9/1974 | Nelson et al. | | |
| 3,869,107 A * | 3/1975 | Field, Jr. | ............. | F16K 11/0704 251/297 |
| 4,260,132 A * | 4/1981 | Habiger | .............. | F16K 11/0704 251/297 |
| 4,458,645 A * | 7/1984 | Schwartzman | ......... | F02D 29/04 123/378 |
| 4,663,800 A * | 5/1987 | Mettenleiter | ........... | E05F 3/104 16/72 |
| 4,844,412 A * | 7/1989 | Kubozono | .......... | F16K 11/0704 251/297 |
| 7,437,872 B2 * | 10/2008 | Kim | ........................ | F15B 15/19 92/24 |
| 8,162,581 B2 * | 4/2012 | Soltis | .................... | F16B 21/165 411/347 |
| 10,077,623 B2 * | 9/2018 | Carrillo | ............... | F16K 11/0704 |
| 11,499,646 B2 * | 11/2022 | Kozma | ................. | B60T 15/048 |
| 2012/0080633 A1 * | 4/2012 | Xu | ...................... | F16K 11/0704 251/326 |
| 2018/0051625 A1 * | 2/2018 | Jung | ..................... | F02B 75/045 |

FOREIGN PATENT DOCUMENTS

| | | |
|---|---|---|
| DE | 10 2016 213 820 | 4/2017 |
| DE | 10 2015 225 858 | 6/2017 |
| DE | 10 2016 220 684 | 4/2018 |
| EP | 2 562 454 | 2/2013 |

* cited by examiner

VALVE DEVICE

FIELD OF THE INVENTION

The invention relates to a valve device having a valve housing, in which fluid ports are provided and in which at least one valve piston can be moved longitudinally. The valve piston either separates at least two of the fluid ports from one another or interconnects them depending on its travel position. At least one latching device for each valve piston detachably fastens the respective valve piston in one of its travel positions. The latching device has at least one latching means, which can be brought into a latching position.

BACKGROUND OF THE INVENTION

DE 196 17 849 A1 discloses a device for clamping a piston of a directional control valve in its individual setting position. The device has a valve housing, in which the piston is disposed in an axially displaceable manner. A clamping device is provided at each axial end of the valve housing. An attached piston part, whose cross section widens conically in the direction of its free end and which is enclosed by a cage of the clamping device, adjoins the relevant axial end of the valve piston. The cage is provided with recesses, in which ball-shaped clamping bodies are inserted, which are disposed in the radial direction between the piston part at the valve piston and the valve housing. When flow forces try to move the valve piston against the switching direction, the clamping effect of the clamping device sets in. In so doing, the piston portion presses the balls radially against a sleeve firmly installed in the valve housing, thereby holding the valve piston axially assisted by friction in a form-fitting manner. When the valve piston is to be moved to its other switching position, the plunger of a magnetic actuating device acts on the cage, causing the cage to move in the direction of the valve piston in such a way that first the friction-assisted form-fitting holder of the valve piston is detached by loosening the clamped balls and then, after a short travel distance of the cage, the cage carries the valve piston along to its other switching position.

As the cage moves, it carries the balls along. The friction-assisted form-fitting positioning of the valve piston does not correspond to an exactly predefinable travel position of the valve piston, in particular with regard to its end positions to be taken. Rather, every travel position of the valve piston, in which an unintentional switching of the valve piston by means of the balls is prevented, shall be regarded as "held". This increases the clamping force effect when holding the valve piston against the actuating direction in the event of an unintentional travel motion, making subsequent actuation more difficult.

DE 20 2006 014 780 U1 discloses a pneumatic valve for controlling air flows at low operating pressures, having a valve spool disposed in a valve housing so as to be linearly displaceable and having holding means for the detachable immobilization of the valve spool at the housing in two switching positions reached by the linear displacement. The holding means have at least: a receiving channel passing transversely through the valve spool and its two mutually opposite channel orifices opening out towards the outer circumference of the valve spool; two ball-shaped latching members, which are disposed in the receiving channel in the area of the two channel orifices and can move largely independently of each other relative to the valve spool in the longitudinal direction of the receiving channel; a compression spring device disposed in the receiving channel between the two latching members and acting on the two latching members in the sense of keeping them apart; and two latching recess arrangements that are stationary in the direction of the linear displacement motion of the valve spool with respect to the valve housing, each being shaped like an annular groove coaxial with the valve spool. The annular groove is disposed in the area of the outer circumference of the valve spool at a position corresponding to the switching position to be set and with which the two latching members can come into detachable latching engagement when the switching position to be set is reached. The individual latching positions are spaced apart from one another as viewed axially with respect to the longitudinal axis of the valve spool.

When the valve spool is displaced, the pairs of latching balls are pressed out of the latching position and into the receiving channel against the spring force effect and reach the new latching position after passing through the axial travel path due to the spring force. Once one of the two switching positions has been reached, the valve spool remains in the corresponding position even if the actuating force applied by a pilot valve device that brought it into this latching position is removed. The valve spool therefore remains in the individual switching position without a constant supply of energy from the outside until it receives a switching pulse, wherein the latching balls, which are spring-loaded in their respective latching positions, can remain on the valve spool in view of the relatively low pneumatic forces.

For very high fluid forces, such as those that regularly occur in hydraulics, the known solution is therefore unlikely to be very suitable.

SUMMARY OF THE INVENTION

The invention addresses the problem of providing a valve device having a functionally reliable detachable fastening of its valve piston, which detachable fastening is also suitable for high forces acting on the valve piston, as they regularly occur in hydraulics.

A valve device, solving this problem according to the invention, is basically characterized in that, as part of the respective latch for detachably fastening the respective valve piston, at least one control body that can be moved independently of the respective valve piston is provided. The control body is set up such that, in at least one blocking position, it prevents the respective latch disposed in the latching position from leaving the latching position by blocking the latch.

In accordance with the invention, it has first been recognized that the latch has to fulfill contradictory functions. Ideally, the latch should be designed in such a way that, on the one hand, it holds the valve piston, which is subject to high forces depending on the use of the valve device, securely in its respective detachable fastening position, in that way counteracting any unintentional motion of the valve piston, and that, on the other hand, when the valve is intentionally actuated and the valve piston is moved, the latch releases the valve piston for its travel motion without requiring a great deal of force. The valve device of the invention take these conditions into account. A high force acting on the valve piston can be, for instance, a fluid force and/or spring force.

The features of the invention, in contrast to the valve device known from the prior art, provide for a latch separate from the valve spool, on which the high forces may act depending on the use of the valve device, such that the latched immobilization of the valve spool can be detached by an actuator without simultaneous action on the valve spool and without loosening a friction-based clamping of the latch in a kind of pilot control. Accordingly, the actuating force to be applied by the actuator to detach the latching does not directly depend on the forces acting on the valve piston during operation of the valve device. In addition, when the valve piston is locked in place, the holding force applied by the respective latch is completely independent of friction. This means that, in the case of high forces at least temporarily acting on the valve piston, an actuator can be selected that is less powerful than an actuator by which the latching can be detached by direct action on the valve piston, which helps to reduce the cost of energy and the space required by the valve device. As a result, the range of application of the device according to the invention can be increased. Because the pilot control and/or the holding action manage each at least partially without spring force support, the operational safety is increased, so that the valve device according to the invention can also be used in particular for safety-relevant areas, such as controls of power presses or actuating devices for power plants.

Further advantages of the solution according to the invention are provided.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
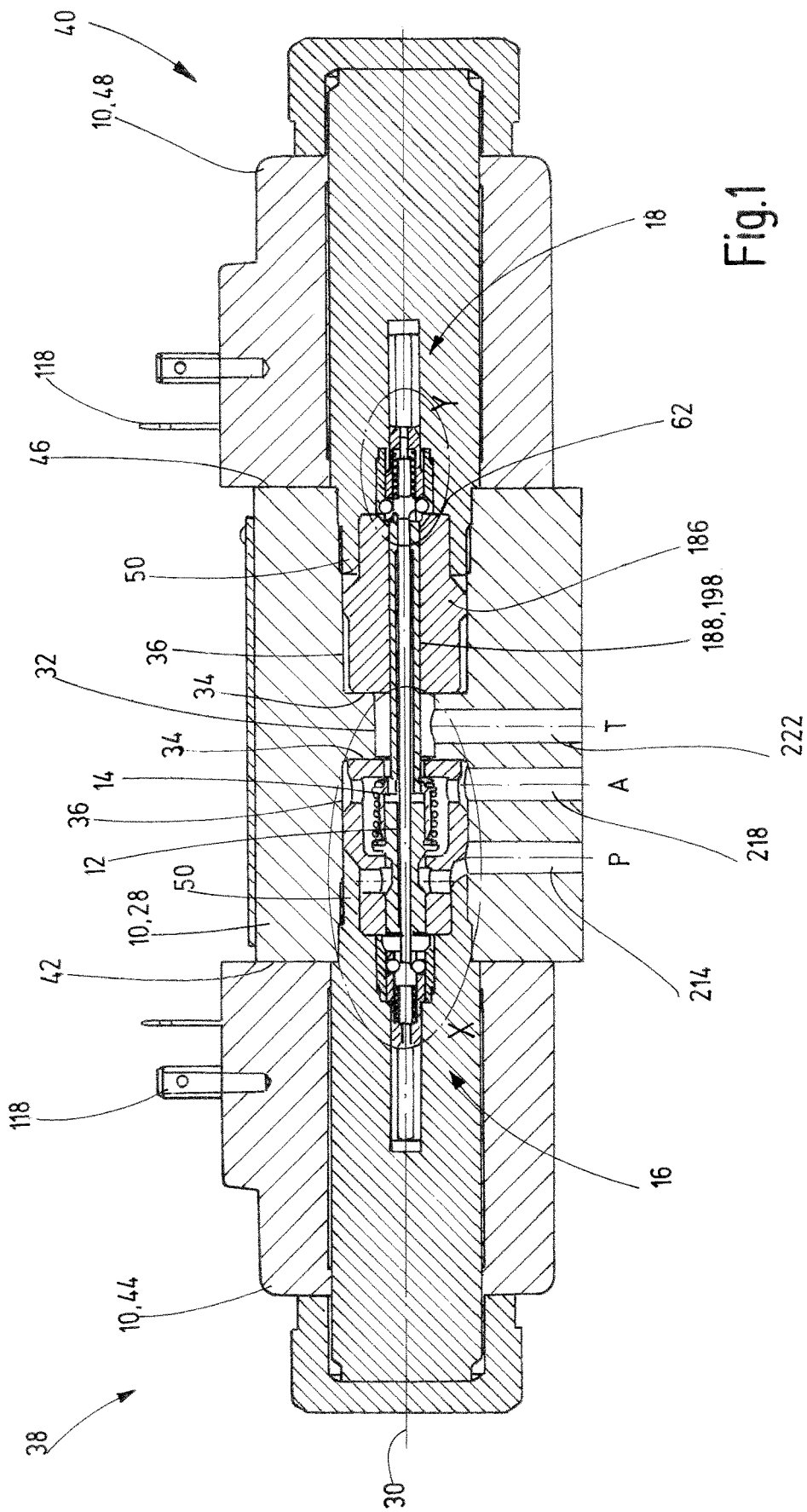
FIG. 1 is a schematically simplified side view in section of a valve device according to an exemplary embodiment of the invention.

FIG. 1 shows a valve device according to the invention having a valve housing 10, in which fluid ports P, A, T are provided and in which a first valve piston 12 and a second 14 valve piston can be moved longitudinally. Two of the fluid ports P, A, T can either be separated from each other or interconnected depending on the travel position of the respective valve pistons 12, 14. The valve device also has a first latching device or latch 16 for the first valve piston 12 and a second latching device or latch 18 for the second valve piston 14, each for detachably fastening the respective valve pistons 12, 14 in one of their travel positions. Each latching device 16, 18 has latching means or a latch part 20, which can be brought into a latching position 22.

As part of the respective latching devices 16, 18, at least one first control body 24 that can be moved independently of the respective valve pistons 12, 14 is provided for detachably fastening the respective valve pistons 12, 14, which control body 24 is set up such that, in at least one blocking position, it prevents the respective latching means 20 disposed in the latching position 22 from leaving the latching position 22 by blocking the latching means 20.

The valve housing 10 has a main housing part 28, in which the two valve pistons 12, 14 can be moved along one and the same longitudinal axis 30. A passage 32 extends through the main housing part 28 in the longitudinal direction 30 of the valve pistons 12, 14, the inner diameter of which passage is widened to form a step 34 in the direction of a first actuating device or actuator 38 and a second actuating device or actuator 40.

As part of the valve housing 10, a housing 44 of the first actuating device 38 adjoins at one end 42 of the main housing part 28 and a housing 48 of the second actuating device 40 adjoins at the other end 46 opposite from the one end 42, each for actuating one of the valve pistons 12, 14 and all latching devices 16, 18. The two actuating devices 38, 40 are identical and are each designed as magnetic actuating devices. The housing 44, 48 of the respective actuating device 38, 40 has, at the end facing the main housing part 28, a cylindrical extension 50 extending towards the main housing part 28 and having an outer diameter 51 largely equal to the inner diameter 52 of the respective passage enlargement 36 of the main housing part 28. A threaded section 54 between the outer circumference 51 of the cylindrical extension 50 of the housings 44, 48 of the respective actuating device 38, 40 and the respective passage enlargement 36 of the main housing part 28 is used to secure the housing 44, 48 of respective actuating device 38, 40 to the main housing part 28. Starting from the end face 56 facing the main housing part 28, of the extension 50 of the housings 44, 48 of the respective actuating devices 38, 40, a cylindrical recess 58 is formed in the extension 50, which cylindrical recess 58 extends coaxially with the longitudinal axis 30 of the valve pistons 12, 14. The inner diameter 60 of the respective cylindrical recess 58 decreases, forming a first step 62 and a second step 64 starting from the opening 66 facing the valve pistons 12, 14, of the recess 58 in a direction away from the valve pistons 12, 14.

The recess 58 of the housing 44, 48 of the respective actuating device 38, 40 and the respective passage enlargement 36 of the main housing part 28 each delimit a space 68, in which the first latching device 16 and the second latching device 18, respectively, are disposed on opposite end faces 70, 72 of the valve pistons 12, 14, wherein the second latching device 18 is identical to the first latching device 16, mirrored on a plane extending perpendicularly to the longitudinal axis 30 of the valve pistons 12, 14. Such a respective combination of actuating device 38, 40 and latching device 16, 18 will now be explained in more detail as representative of both matching combinations of actuating device 38, 40 and latching device 16, 18.

A sleeve-shaped second control body 74, which is stationarily disposed in the housing 44, 48 of the actuating device 38, 40, is in end-face contact with the second step 64 of the housing 44, 48 of the actuating device 38, 40. The axial length of the second control body 74 is equal to the axial distance from the first step 62 to the second 64 step of the recess 58 of the housing 44, 48 of the actuating device 38, 40. The second control body 74 has an outer diameter 76 largely equal to the inner diameter 76 of the recess 58 of the extension 50 in the area between the first 62 and second 64 steps. At its end area facing the valve piston 12, 14, the second control body 74 has a stop surface 80 for the latching means 20 on its inner circumferential side as an abutment, which stop surface 80 is part of an enlargement 78 extending through to its end facing the valve pistons 12, 14, of the inner diameter of the second control body 74 in the direction of the valve pistons 12, 14. The dimensions of the stop surface 80 are adapted to the contour of a latching means 20 shaped spherically. Viewed in the direction of the longitudinal axis 30 of the valve pistons 12, 14, the ratio of the length of the inner circumference area of the second control body 74 free of enlargement in inner diameter to the length of the area of its enlargement in inner diameter 78 is approximately 3.5 to 1.

Figure 2:
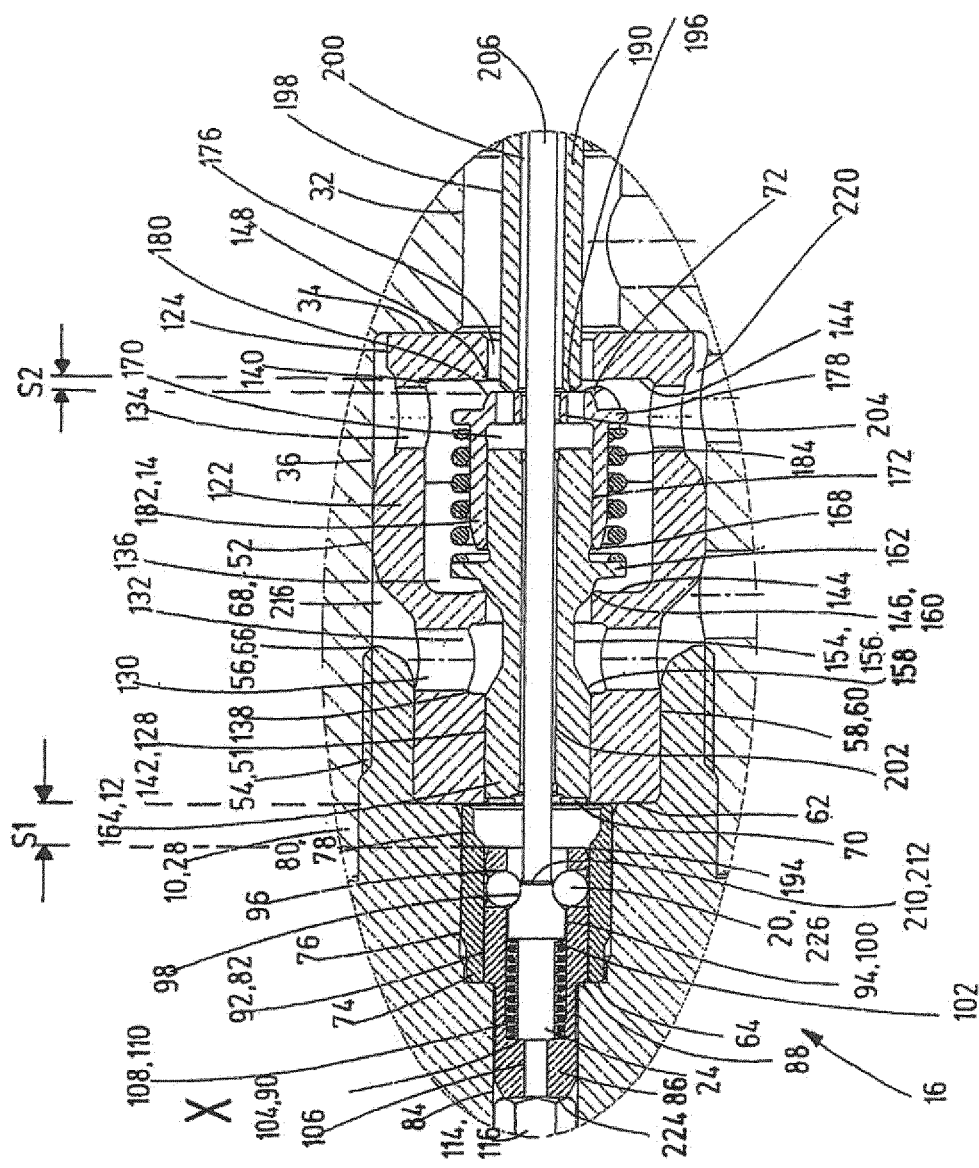
FIG. 2 is a side view in section of the valve device of FIG. 1, magnified in relation to FIG. 1, of a partial cross-section of the valve device in the area marked X in FIG. 1.
Figure 3:
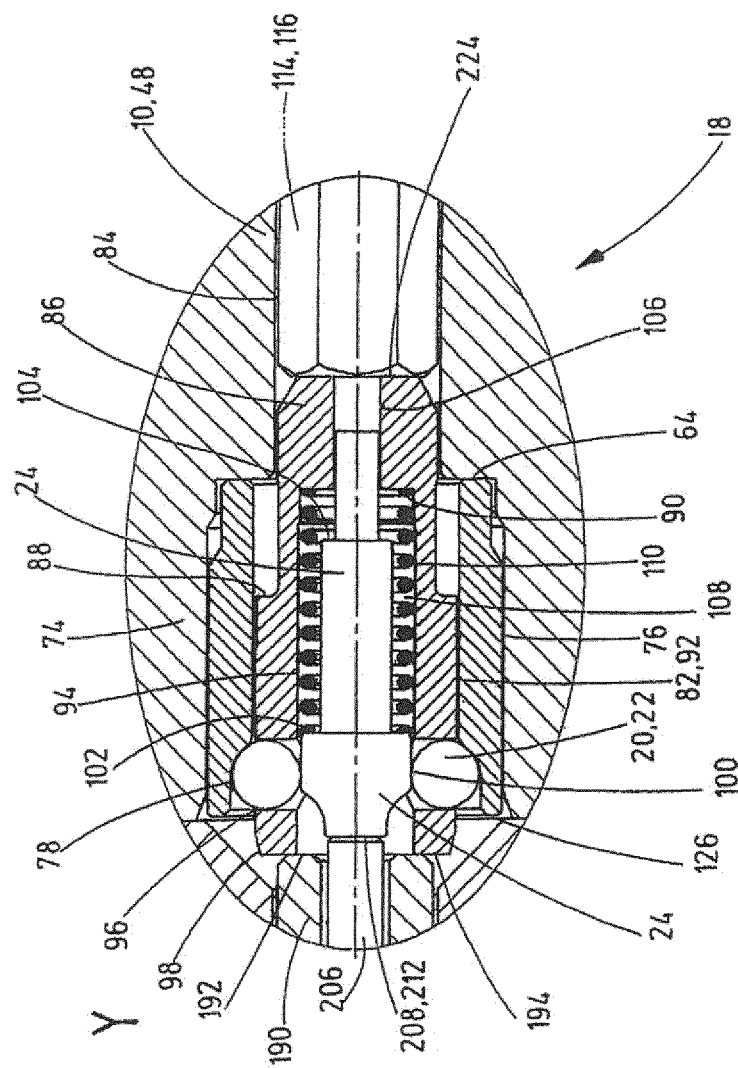
FIG. 3 is a side view in section of the valve device of FIG. 1, magnified in relation to FIG. 1, of a partial cross-section of the valve device in the area marked Y in FIG. 1.

A hollow cylindrical guide sleeve 86 is guided for travel along the inner circumference of the second control body 74 in the area of its smallest inner diameter 82 and on the inner circumference 84 of the recess 58 of the housing 44, 48 of the actuating device 38, 40 in the area starting from its second step 64 in the direction away from the valve pistons 12, 14. In the direction away from the valve pistons 12, 14, the outer circumference of the guide sleeve 86 is reduced in its central section forming a step 88 and tapers conically at its end section facing away from the valve pistons 12, 14. Viewed in the direction of the longitudinal axis 30 of the valve pistons 12, 14, the length of the guide sleeve 86 between its outer circumferential step 88 and its end facing the valve pistons 12, 14 is approximately as long as the circumferential area of the second control body 74 free of enlargement in inner diameter. The outer circumference of the guide sleeve 86 decreases conically at its end section facing the valve pistons 12, 14 towards the valve pistons 12, 14. In FIG. 2, the guide sleeve 86 of the first latching device 16 is disposed in its end position furthest away from the valve pistons 12, 14, such that the outer circumferential step 88 of this guide sleeve is in contact with the second step 64 of the housing 44 of the actuating device 38. At the same time, as shown in FIG. 3, the outer circumferential step 88 of the guide sleeve 86 of the second latching device 18 is lifted from the second step 64 of the housing 48 of the actuating device 40. At its end section facing away from the valve pistons 12, 14, the inner circumference of the guide sleeve 86 is reduced in the direction away from the valve pistons 12, 14, forming a step 90. At its end section facing the valve pistons 12, 14, in which end section the guide sleeve 86 has its largest outer diameter 92 and inner diameter 94, the guide sleeve 86 has passages 96 extending through the guide sleeve 86 in the radial direction. The passages 96 are disposed around the circumference of the guide sleeve 86. The smallest inner diameter of the respective passage 96 is slightly larger, and the radial wall thickness of the guide sleeve 86 in the area of the passage 96 is smaller than the largest diameter of a single latching means 20 having the form of a ball, which latching means is disposed guided in the respective passage 96.

The rotationally symmetrical first control body 24 is guided for travel in the guide sleeve 86. At its end section facing the valve pistons 12, 14, the first control body 24 has, in the direction of the valve pistons 12, 14, a full-circumference and funnel-shaped outer circumferential reduction, which, viewed in longitudinal section, is mainly formed like a divided circle. The radius of the divided circle equals approximately half the diameter of a latching means 20 designed as a ball. This reduction in outer circumference forms a control surface 98 of the first control body 24 for the latching means 20. Adjacent to the control surface 98 of the first control body 24 in a direction away from the valve pistons 12, 14, the first control body 24 initially has its full outer diameter 100, which decreases in a direction away from the valve pistons 12, 14, while forming a first step 102 and a second step 104. Viewed in the direction of the longitudinal axis 30 of the valve pistons 12, 14, the length of the area 100 of the first control body 24, in which it has the full outer diameter 100, is slightly smaller than the smallest diameter of a single radial passage 96 through the guide sleeve 86 for accommodating a single latching means 20. The first control body 24 is in the area 100 of its full outer diameter 100 and in the area between its second step 104 and its end facing away from the valve pistons 12, 14 guided in the guide sleeve 86 in the area of its largest 94 or its smallest 106 inner diameter. In the area between its first 102 and second 104 step, the first control body 24, while forming an annular space 108, is spaced apart from the inner circumference of the guide sleeve 86 in the area of its largest inner diameter 94. An energy storage device in the form of a first compression spring 110 is provided in the annular space 108, through which compression spring 110 the first control body 24 extends and one end of which rests against the first step 102 of the first control body 24 and the other end of which rests against the inner circumferential step 90 of the guide sleeve 86. As a result, the first control body 24 is preloaded in the direction of the valve pistons 12, 14.

The actuating device 38, 40 has an energizable actuating magnet that acts on an actuating rod 114 of a multipart rod drive 116. On the upper end of the housing 44, 48 of the actuating devices 38, 40 plug parts 118 are provided, which are electrically connected to the actuating magnet and which can be used to energize the actuating magnet. The actuating rod 114 is guided on the inner circumference 84 of the recess 58 of the housing 44, 48 of the actuating device 38, 40, in an area starting from the second step 64 of the recess 58 in the direction away from the valve pistons 12, 14.

A substantially rotationally symmetrical bell-shaped first insert housing part 122 is accommodated in the space 68 delimited by the first actuating device 38 and the main housing part 28. The first insert housing part 122 has its largest outer diameter 52 in its central section, which largest outer diameter 52 is in contact with the inner diameter 52 of the passage enlargement 36 of the main housing part 28, and has its smallest outer diameter 60 in its end section facing the first latching device 16, which smallest outer diameter 60 is in contact with the inner diameter 60 of the recess 58 of the extension 50 of the housing 44 of the first actuating device 38 in the area between its first step 62 and its opening 66. At its end section 124 facing the second latching device 18, the first insert housing part 122 is spaced apart from the inner diameter 52 of the passage enlargement of the main housing part 28, wherein the outer diameter of this end section of the first insert housing part 122 is smaller and larger than its largest 52 and smallest 60 outer diameter, respectively. The end face 62 facing the first latching device 16 of the first insert housing part 122 is in contact with the first step 62 of the recess 58 of the housing 44 of the first actuating device 38 and the end face 126 facing the valve pistons 12, 14, of the second control body 74 of the first latching device 16. The end face 34 facing the second latching device 18 of the first insert housing part 122 is in contact with the step 34 of the passage 32 of the main housing part 28.

The first insert housing part 122 has a central passageway 128 extending in the axial direction 30. In the radial direction and in the direction of the sectional plane shown in the figures, two first transverse channels 130 extend into the first insert housing part 122 opposite from each other in the area of the smallest outer diameter 60 of the first insert housing part 122, the respective openings of which transverse channels 130 on the outer circumference of the first insert housing part 122 are not covered by the extension 50 of the housing 44 of the first actuating device 38 and which each open out in a first fluid chamber 132 in the first insert housing part 122. At least in the radial direction and in the direction of the sectional plane shown in the figures, two second transverse channels 134 extend into the first insert housing part 122 opposite from each other in the end section of the first insert housing part 122 facing the second latching device 18, each of which channels 134 opens out in a control chamber 136 in the first insert housing part 122. The first fluid chamber 132 and the control chamber 136, as parts of the passage 128 through the first insert housing part 122, are disposed coaxially with the longitudinal axis 30 of the valve pistons 12, 14 and have inner diameters 138, 140 larger than the smallest constant inner diameter 142 of the first insert housing part 122 between these chambers 132, 136 and outside these chambers 132, 136. The transition of the inner wall 144 facing the first device 16 and second 18 latching device, of the control cavity 136 to the smallest inner diameter 142 of the passage 128 of the first insert housing part 122, forms a first annular control 146 and second 148 annular control edge, respectively, which are each used as valve seats of a first poppet valve and second poppet valve.

The end section facing the first latching device 16 of the first valve piston 12 is guided at the smallest inner diameter 142 of the passage 128 of the first insert housing part 122, in the first insert housing part's end section facing the first latching device 16. In its central section, the first valve piston 12 has a trough-shaped recess 154, as viewed in longitudinal section, which recess 154 has a base end 156 aligned in parallel to the longitudinal axis 30 and side wall parts 158 extending outwards from each end of the base end 156 in both the radial and the axial directions 30. In the direction of the second latching device 18, the side wall part 158 facing the second latching device, of the recess 154 of the first valve piston 12 is adjoined by an enlargement in diameter, which initially extends outwards in the radial direction and in the axial direction 30 and forms a control edge 160 and then forms a full circumferential projection 162 extending away outwards in the radial direction of the first valve piston 12. The first valve piston 12 extends through the first fluid chamber 132 and the passage 128 in the area of its smallest inner diameter 142 between the first fluid chamber 132 and the control chamber 136 into the control chamber 136, where the control edge 160 and the projection 162 of the first valve piston 12 are disposed. Formed in this way, the first valve piston 12 is used as the valve closing body 164 of the first poppet valve.

The cup-shaped second valve piston 14 is disposed in the control chamber 136, which second valve piston 14 is guided on the end section facing the second latching device 18 of the outer circumference of the first valve piston 12. For this purpose, a cylindrical recess 170 is made in the end face 168 facing the first latching device 16, of the second valve piston 14, the inner diameter 172 of which cylindrical recess 170 is largely equal to the outer diameter 172 of the first valve piston 12 in its end section facing the second latching device 18. A decentralized passage arrangement 176 aligned coaxially with the longitudinal axis 30, wherein the passage arrangement 176 is formed by individual passage segments disposed on a fictitious circle, extends through the end face 72 facing the second latching device 18, of the second valve piston 14. The passage arrangement 176 is used to equalize the pressure between the inside and the outside of the second valve piston 14. In the end section facing the second latching device 18, of its outer circumference, the second valve piston 14 has a full-circumference projection 178 extending away outwards in the radial direction. In the direction of the second latching device 18 adjacent the projection 178, the second valve piston 14 has a reduction in outer diameter that forms a control edge 180 of the second valve piston 14. Formed in this way, the second valve piston 14 is used as the valve closing body 182 of the second poppet valve.

An energy storage in the form of a second compression spring 184 is disposed between the projections 162, 178 of the valve pistons 12, 14, the ends of which second compression spring 184 rest on the projection 162, 178 of the first valve piston 12 and the second valve piston 14, respectively. As a result, the respective valve piston 12, 14 as valve closing body 164, 182 is preloaded in the direction of its respective valve seat 146, 148, which is formed on the first insert housing part 122.

A rotationally symmetrical second insert housing part 186 is accommodated inside the space 68 delimited by the second actuating device 40 and the main housing part 28. The end face 62 facing the second latching device 18, of the second insert housing part 186, is in contact with the first step 62 of the recess 58 of the housing 48 of the second actuating device 40, and the end face 34 facing the first latching device 16, of the second insert housing part 186, is in contact with the step 34 facing the second latching device 18, of the passage 32 of the main housing part 28.

The second insert housing part 186 has a central passage 188, in which a pilot valve spool 190 is guided. In FIG. 1, one end face 192 of the pilot valve spool 190 is in contact with the end face 194 facing the first latching device 16, of the guide sleeve 86 of the second latching device 18 (FIG. 3), and the other end face 196 of the pilot valve spool 190 is in contact with the end face 72 facing the second latching device 18, of the second valve piston 14 (FIG. 2). The outer diameter 198 of the pilot valve spool 190 is larger than the full or largest outer diameter 100 of the first control bodies 24 and the largest inner diameter of the guide sleeves 86.

The two valve pistons 12, 14 and the pilot valve spool 190 each have a central passage 200, 202, 204, through each of which the same control rod 206 of the rod drive 116 extends. The inner diameter of the passage 200 of the pilot valve spool 190 is smaller than the largest outer diameter 100 of the first control bodies 24. The control rod 206 can be moved independently of and relative to the two valve pistons 12, 14 and the pilot valve spool 190. One end face 208 of the control rod 206 is in contact with the end face 212 facing the first latching device 16, of the first control body 24 of the second latching device 18, and the other end face 210 of the control rod 206 is in contact with the end face 212 facing the second latching device 18 of the first control body 24 of the first latching device 16 or is integral with the first control bodies 24.

In FIG. 2, S1 describes the travel path of every guide sleeve 86 between its end position furthest from the valve pistons 12, 14 and its position acting directly or indirectly on the respective valve pistons 12, 14, in which position the guide sleeve 86 lifts the valve piston 12, 14 off its valve seat 146, 148 against the action of the compression spring 184. S2 describes the travel path of the respective other valve piston 12, 14 between its end position lifted off its valve seat 146, 148 and its valve seat 146, 148 and/or the travel path of this guide sleeve 86 between its position acting indirectly or directly on the respective valve piston 12, 14, in which the guide sleeve 86 lifts the valve piston 12, 14 off its valve seat 146, 148 against the action of the compression spring 184, and its blocking position.

The ratio of S1 to S2 is defined as the overlap in this case. In FIG. 2, in relation to the guide sleeve 86 of the first latching device 16, S1 is greater than S2 in relation to the second valve piston 14, so that there is a positive overlap. Likewise, the ratio of S1 in relation to the guide sleeve 86 of the second latching device 18 is greater than S2 in relation to the first valve piston 12. However, it is also conceivable that in each case the overlap is zero for a ratio of 1 or negative for a ratio smaller than 1.

In the case of a positive overlap, the valve device is set up in such a way that the respective one valve piston 12, 14 comes into contact with its valve seat 146, 148 before the respective other valve piston 12, 14 lifts off from its valve seat 146, 148, such that at no time both valve pistons 12, 14 are simultaneously lifted off their valve seats 146, 148. This prevents all fluid ports P, A, T from being interconnected in a fluid-conveying manner at least for a short time in a transition position during a switching process, rendering a loss of energy due to a fluid pressure reduction towards the return port T impossible.

Radially and in the direction of the sectional plane shown in the figures, a first fluid passage 214 extends through the main housing part 28 between a pressure supply port P on the main housing part 28 and a third fluid chamber 216 connected to the first transverse passages 130, and a second fluid passage 218 extends between a utility port A on the main housing part 28 to a fourth fluid chamber 220 connected to the second transverse passages 134, both of which are disposed in the space 68 delimited by the first actuating device 38 and the main housing part 28. The third fluid chamber 216 is delimited by the outer surface of the first insert housing part 122, the inner periphery of the passage enlargement 36 of the main housing part 28, and the end face 56 facing the second latching device 18 of the extension 50 of the housing 44 of the first actuating device 38. The fourth fluid chamber 220 is delimited by the inner circumference of the passage enlargement 36 of the main housing part 28, the step 34 of the passage enlargement 36, and the outer surface of the first insert housing part 122. In addition, a third fluid passage 222 extends in the radial direction and in the direction of the sectional plane shown in the figures through the main housing part 28 between a return port T, in particular a tank port, on the main housing part 28 and a fifth fluid chamber co-delimited by the passage 32 of the main housing part 28 in the area of its smallest inner diameter and by the two insert housing parts 122, 186.

The components of the valve device that come into contact with the latching means 20, can have low-friction surfaces or be coated with low-friction materials, ensuring permanently easy and low-wear actuation of the respective latching device 16, 18 without any loss of operational reliability.

The functioning of the valve device according to the invention is described in more detail below:

In FIG. 1, the first latching device 16 is shown in its unlatched state (FIG. 2) and the second latching device 18 is shown in its latched state (FIG. 3).

In this case, the outer circumferential step 88 of the guide sleeve 86 of the second latching device 18 is lifted off the second step 64 of the recess 58 of the housing 48 of the second actuating device 40. The end face 194 facing the first latching device 16, of the guide sleeve 86 of the second latching device 18 is in contact with one end face 192 of the pilot valve spool 190, the other end face 196 of which lifts the second valve piston 14 off its valve seat 148 against the force of the second compression spring 184. At the same time, the first valve piston 12 is in contact with its valve seat 146, preloaded by the force of the second compression spring 184.

In addition, the second step 104 of the first control body 24 of the second latching device 18 is lifted off the inner peripheral step 90 of the guide sleeve 86 of the second latching device 18 under the action of the first compression spring 110. The end face 212 facing the first latching device 16, of the first control body 24 of the second latching device 18 is in contact with one end face 208 of the control rod 206, the other end face 210 of which is in contact with the end face 212 facing the second latching device 18, of the first control body 24 of the first latching device 16. The second step 104 of the first control body 24 of the first latching device 16 is in contact, against the action of the first compression spring 110, with the inner circumferential step 90 of the guide sleeve 86 of the first latching device 16, the outer circumferential step 88 of which, in the end position of the guide sleeve 86 furthest from the valve pistons 12, 14, is in contact with the second step 64 of the recess 58 of the housing 44 of the first actuating device 38.

When the first latching device 16 is disposed in one of its release positions, the respective ball 20 disposed in its release positions 226 projects radially inwards, abutting the control surface 98 of the first control body 24 of the first latching device 16, into the cavity of the guide sleeve 86 of the first latching device 16, such that the first control body 24 is secured relative to the guide sleeve 86 between the inner circumferential step 90 of the guide sleeve 86 of the first latching device 16 and the balls 20. In addition, a motion of the respective ball 20 outwards in the radial direction is limited by the inner circumference of the second control body 74 of the first latching device 16 in the area of its smallest inner diameter 82, such that the respective ball 20 projecting into the cavity of the guide sleeve 86 of the first latching device 16, are held blocked in the release position 226 and the guide sleeve 86 is released together with the first control body 24 for a travel motion in the second control body 74.

With the second latching device 18 disposed in its blocking position, the respective ball 20 disposed in its latching position 22, projects radially outwards, abutting the stop surface 80 of the second control body 74 of the second latching device 18, beyond the outer circumference of the guide sleeve 86 in the area of its largest outer diameter 92, such that the guide sleeve 86 of the second latching device 18 is blocked at least for a travel motion in the direction away from the valve pistons 12, 14, which guide sleeve 86 lifts the second valve piston 14 off its valve seat 148 against the force of the second compression spring 184 via the pilot valve spool 190. In addition, a motion of the respective ball 20 in the radial direction inward is limited by the outer circumference of the first control body 24 of the second latching device 18 in the area of its largest outer diameter 100, such that the respective ball 20 is held blocked in its latching position 22 projecting beyond the outer circumference of the guide sleeve 86 of the second latching device 18. At the same time, the first control body 24 of the second latching device 18 is released for a travel motion in the guide sleeve 86 of the second latching device 18, but is preloaded into its blocking position by the first compression spring 110.

In this arrangement of the valve pistons 12, 14, the utility port A is connected to the return port T in a fluid-conveying manner, both of which ports are separated from the pressure supply port P.

If, starting with the arrangement of the two valve pistons 12, 14 shown in FIG. 1, the second valve piston 14 is to be brought into contact with its valve seat 148 and the first valve piston 12 is to be lifted off its valve seat 146, the actuating magnet of the first actuating device 38, which acts on the actuating rod 114 and extends in the direction of the second actuating device 40, is energized. In so doing, the actuating rod 114 acts on the end face 224 facing away from the valve pistons 12, 14, of the guide sleeve 86 of the first latching device 16, the inner circumferential step 90 of which being in contact with the second step 104 of the first control body 24 of the first latching device 16, entrains the first control body 24 of the first latching device 16 in the direction of the second actuating device 40 until the end face 194 facing the valve pistons 12, 14, of the guide sleeve 86 of the first latching device 16 comes into contact with the end face 70 facing the first actuating device 38, of the first valve piston 12. Subsequently, the guide sleeve 86 of the first latching device 16 acts on the first valve piston 12 in the direction of the second actuating device 40, causing the first valve piston 12 to be lifted off its valve seat 146. During this travel motion, the balls 20 resting in their release position 226 against the control surface 98 of the first control body 24 of the first latching device 16, are pressed in the radial direction into their latching position 22 by the first control body 24 of the first latching device 16 under the action of the force of the first compression spring 110 of the first latching device 16, as soon as the radial passages 96 of the guide sleeve 86 of the first latching device 16, as viewed in the axial direction 30, come into overlap with the inner circumference of the second control body 74 of the first latching device 16 in the area of the enlargement in inner diameter 78 of the second control body 74 having the stop surface 80. There, the guide sleeve 86 is disposed in its blocking position.

The travel distance of the guide sleeve 86 relative to the second control body 74 between its end position furthest from the valve pistons 12, 14 and its blocking position is approximately one third of the length of the second control body 74 in the direction of the longitudinal axis 30 of the valve pistons 12, 14. The travel distance of the first control body 24 relative to the guide sleeve 86 between its end position furthest from the valve pistons 12, 14 and its blocking position is approximately one-sixth of the length of the second control body 74 in the direction of the longitudinal axis 30 of the valve pistons 12, 14.

At the same time, the end face 212 facing the second actuating device 40, of the first control body 24 of the first latching device 16 acts via the control rod 206 on the first control body 24 of the second latching device 18, such that the latter is moved relative to the guide sleeve 86 of the second latching device 18 against the action of the first compression spring 110 of the second latching device 18 until its second step 104 comes into contact with the inner circumferential step 90 of the guide sleeve 86 of the second latching device 18. During this travel motion, the first control body 24 of the second latching device 18, the largest outer diameter 100 of which has up to then blocked the balls 20 in their latching position, releases the balls 20 for motion into their release position 226 as soon as, viewed in the axial direction 30, the control surface 98 of the first control body 24 of the second latching device 18 comes into overlap with the radial passages 96 of the guide sleeve 86 of the second latching device 18.

When the balls 20, disposed in their release position 226, are in contact with the control surface 98 of the first control body 24 of the second latching device 18, the guide sleeve 86 of the second latching device 18 is released for a travel motion in the direction away from the valve pistons 12, 14 and the second latching device 18 is in an unlatched state. Now, the first control body 24 of the second latching device 18 entrains the guide sleeve 86 of the second latching device 18 until the outer circumferential step 88 of the guide sleeve 86 comes into contact with the second step 64 of the recess 58 of the housing 48 of the second actuating device 40. At the same time, the second valve piston 14, preloaded by the second compression spring 184, acts on the pilot valve spool 190 to the effect that the pilot valve spool 190, the respective end face 192, 196 of which is in contact with the end face 72 facing the second latching device 18, of the second valve piston 14 or the end face 194 facing the valve pistons 12, 14, of the guide sleeve 86 of the second latching device 18 at any time, is moved in the direction of the second actuating device 40 until the second valve piston 14 comes into contact with its valve seat 148. During this travel motion, the balls 20 of the respective latching device 16, 18 change their position in the axial 30 and radial directions along their paths. In this regard, every ball 20 disposed in a passage 96 of the respective guide sleeve 86 of the two latching devices 16, 18 is at least partially disposed between the first control body 24 and second control body 74 of the respective latching device 16, 18 at all times.

In this arrangement of the valve pistons 12, 14, the pressure supply port P is connected to the utility port A in a fluid-conveying manner, both of which ports are separated from the return port T.

If the valve pistons 12, 14 are to be returned to their positions shown in FIG. 1, the actuating magnet of the second actuating device 40 is energized.

While one embodiment has been chosen to illustrate the invention, it will be understood by those skilled in the art that various changes and modifications can be made therein without departing from the scope of the invention as defined in the claims.

The invention claimed is:
1. A valve device, comprising:
a valve housing having fluid ports therein;
a first valve piston movable longitudinally in the valve housing between positions separating at least two of the fluid ports from one another or interconnecting at least two of the fluid ports as a function of a travel position of the first valve piston; and
a first latch connected to the first valve piston detachably fastening the first valve piston in one of travel positions of the first valve piston, the first latch having a first latching part movable into and out of a first latching position and having a first control body movable independently of the first valve piston, the first control body being movable to a first blocking position preventing the first latching part disposed in the first latching position from leaving the first latching position by blocking the first latching part, the first control body being guided displaceable between the first blocking position and a first release position in a first hollow guide sleeve guided for travel between a first sleeve blocking position and a first sleeve release position in a second control body of the first latch, the second control body having an abutment.
2. The valve device according to claim 1 wherein the first latching part contacts the abutment in the first latching position with the first control body in the first blocking position.
3. The valve device according to claim 1 wherein when the first control body is disposed in the first release position, the first latching part is released for disengagement from the abutment.
4. The valve device according to claim 1 wherein the first latching part is movably guided between the first latching position and a first release position of the first latching part in a wall of a hollow guide sleeve of the first latch, a radial wall thickness of the hollow guide sleeve being smaller than a largest diameter of the first latching part.

5. The valve device according to claim 1 wherein
the hollow guide sleeve, when the first latching part is disposed in the first latching position, is disposed in a sleeve blocking position and is blocked by the first latching part for a travel motion in a second control body in at least one direction of travel, at a same time the first control body is released for a travel motion in the hollow guide sleeve.

6. The valve device according to claim 5 wherein
the hollow guide sleeve, when the first latching part is disposed in a release position of the first latching part, entrains the first latching part and/or the first control body is secured by the first latching part relative to the hollow guide sleeve, during travel motions of the hollow guide sleeve in the second control body.

7. The valve device according to claim 1 wherein
the first control body is preloaded by an energy accumulator in ae direction of the first blocking position and/or movable from the first blocking position into the first release position against a force of the energy accumulator by a rod drive.

8. The valve device according to claim 5 wherein
the hollow guide sleeve, when blocked by the first latching part for the travel motion in a second control body in at least one direction of travel, acts on the first valve piston such that the first valve piston is lifted off a valve seat of the first valve piston against the force of an energy storage preloading the first valve piston into a closed position of the first valve piston.

9. The valve device according to claim 7 wherein
the rod drive extends centrally through the first valve piston.

10. The valve device according to claim 5 wherein
the hollow guide sleeve, the first valve piston and a second valve piston movable longitudinally in the valve housing between positions separating at least two of the fluid ports from one another or interconnecting at least two of the fluid ports as a function of a travel position of the second valve piston are guided for travel relative to each other along a longitudinal axis of the first valve piston and the second valve piston.

11. The valve device according to claim 1 wherein
the first control body has, at least sectionally, a cylindrically formed outer diameter being guided in a hollow guide sleeve, when the first control body is disposed in the first blocking position, and limiting motion of the first latching part in such that the first latching part is held blocked in the latching position.

12. The valve device according to claim 1 wherein
the first control body is preloaded by an energy accumulator in a direction of the first blocking position and each of the first valve piston and of a second valve piston movable longitudinally in the valve housing between positions separating at least two of the fluid ports from one another or interconnecting at least two of the fluid ports as a function of a travel position of the second valve piston.

13. The valve device according to claim 1 wherein
a second valve piston is movable longitudinally in the valve housing between positions separating at least two of the fluid ports from one another or interconnecting at least two of the fluid ports as a function of a travel position of the second valve piston, the first and second valve pistons having the first latch and a second latch, respectively, on end faces thereof facing away from each other, a second latch being connected to the second valve piston detachably fastening the second valve piston in one of travel positions of the second valve piston; and
first and second actuators are connected to the first and second latches, respectively, such that when the first actuator is activated to move the first latch from an unlatched state thereof to a latched state thereof, the second actuator is activated to move the second latch from an unlatched state thereof to a latched state thereof, and vice versa.

14. The valve device according to claim 13 wherein
each of the first and second actuators, when activated, acts at least on the first and second valve pistons, respectively, and on the first and second latches, respectively.

15. The valve device according to claim 14 wherein
the second latch having a second latching part movable into and out of a second latching position and having a first control body movable independently of the second valve piston, the first control body of the second latch being movable to a second blocking position preventing the second latching part disposed in the second latching position from leaving the second latching position by blocking the second latching part; and
the first and second latches are operatively interconnected by at least one part of a rod drive disposed therebetween, the rod drive being in contact with the first control bodies of the first and second latches.

16. The valve device according to claim 1 wherein
a first travel distance of the first hollow guide sleeve along a travel path from an end position of the first hollow guide sleeve furthest from the first valve piston to an action position of the first hollow guide sleeve acting for a first time on the first valve piston on the travel path is greater than or equal to a second travel distance of the first hollow guide sleeve from the action position acting for the first time on the first valve piston to first sleeve blocking position.

17. The valve device according to claim 13 wherein
an energy storage extends between the first and second valve pistons and biases the first and second valve pistons away from each other.

18. The valve device according to claim 13 wherein
the first and second valve pistons reach closed positions thereof at a first and second valve seats in directions away from each other.

19. The valve device according to claim 18 wherein
the first and second valve pistons are accommodated in a replaceable insert housing part on which the valve seats are formed.

20. A valve device, comprising:
a valve housing having fluid ports therein;
a first valve piston movable longitudinally in the valve housing between positions separating at least two of the fluid ports from one another or interconnecting at least two of the fluid ports as a function of a travel position of the first valve piston;
a first latch connected to the valve piston detachably fastening the first valve piston in one of travel positions of the first valve piston, the first latch having a first latching part movable into and out of a first latching position and having a first control body movable independently of the first valve piston, the first control body being movable to a first blocking position preventing the first latching part disposed in the first latching position from leaving the first latching position by blocking the first latching part; and a rod drive extends centrally through the first valve piston.

21. A valve device, comprising: a valve housing having fluid ports therein; a first and second valve pistons movable longitudinally in the valve housing between positions separating at least two of the fluid ports from one another or interconnecting at least two of the fluid ports as a function of travel positions of the first and second valve pistons; first and second latches connected to the first and second valve pistons, respectively, on end faces thereof facing away from each other detachably fastening the first and second valve pistons, respectively, in one of travel positions of the first and second valve pistons, the first and second latches having first and second latching parts, respectively, movable into and out of first and second latching positions and each having a first control body movable independently of the respective first or second valve piston, each of the first control bodies being movable to a first blocking position preventing the respective first or second latching part disposed in the first latching position from leaving the first latching position by blocking the first latching part; and first and second actuators are connected to the first and second latches, respectively, such that when the first actuator is activated to move the first latch from an unlatched state thereof to a latched state thereof, the second actuator is activated to move the second latch from an unlatched state thereof to a latched state thereof, and vice versa.

22. The valve device according to claim 21 wherein each of the first and second actuators, when activated, acts at least on the first and second valve pistons, respectively, and on the first and second latches, respectively.

23. The valve device according to claim 22 wherein the first and second latches are operatively interconnected by at least one part of a rod drive disposed therebetween, the rod drive being in contact with the first control bodies of the first and second latches.

24. The valve device according to claim 21 wherein an energy storage extends between the first and second valve pistons and biases the first and second valve pistons away from each other.

25. The valve device according to claim 21 wherein the first and second valve pistons reach closed positions thereof at a first and second valve seats in directions away from each other.

26. The valve device according to claim 25 wherein the first and second valve pistons are accommodated in a replaceable insert housing part on which the valve seats are formed.

* * * * *